July 18, 1967     C. F. BARANAUCKAS ET AL     3,331,895
PREPARATION OF ESTERS OF PHOSPHORUS
Filed July 1, 1963
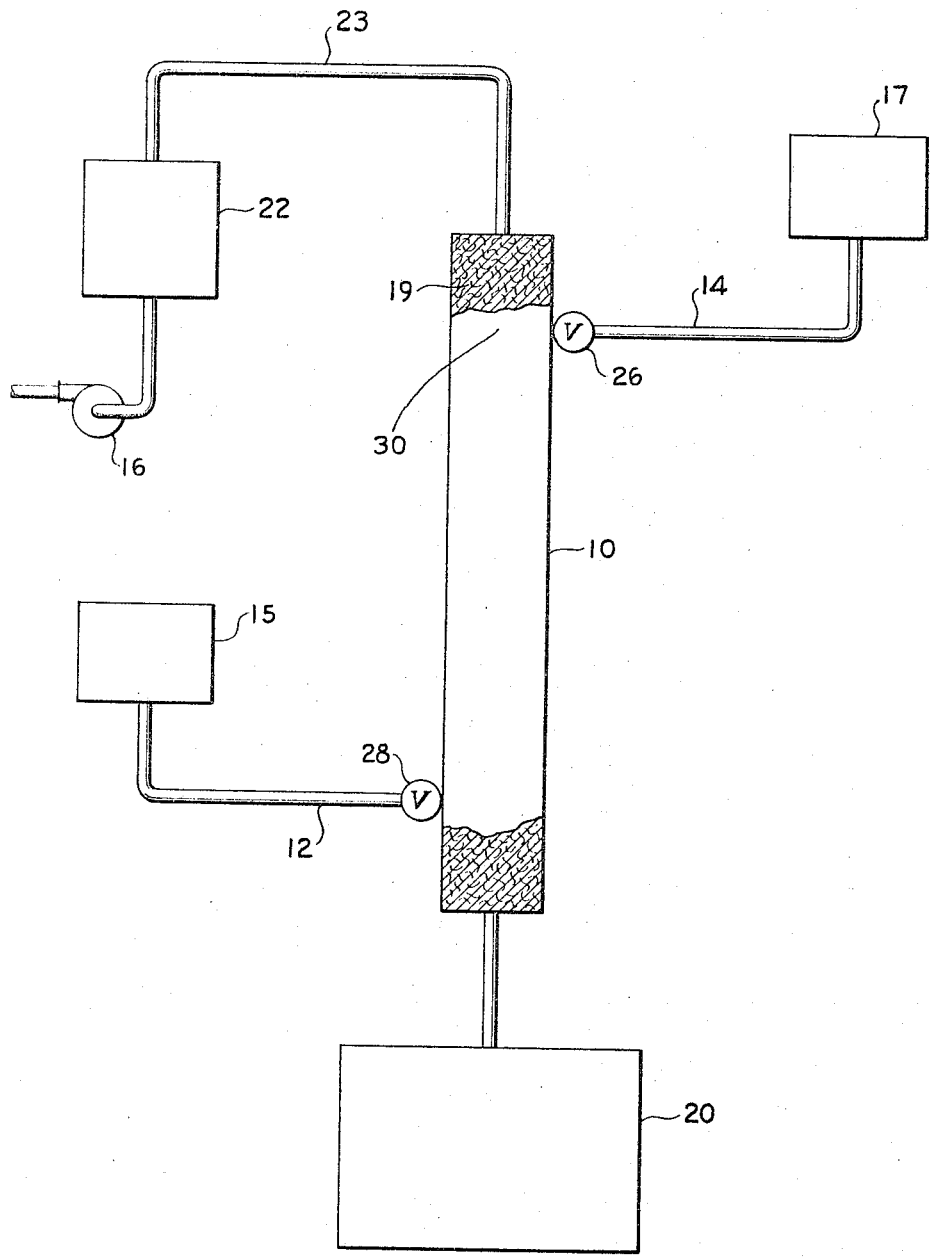

An alytical United States Patent Office 3,331,895
Patented July 18, 1967

3,331,895
PREPARATION OF ESTERS OF PHOSPHORUS
Charles F. Baranauckas, Niagara Falls, and James J. Hodan, Tonawanda, N.Y., assignors to Hooker Chemical Corporation, Niagara Falls, N.Y., a corporation of New York
Filed July 1, 1963, Ser. No. 291,961
14 Claims. (Cl. 260—974)

This invention relates to a process for the preparation of esters of phosphorus. More particularly, it relates to the preparation of lower dialkyl esters of phosphorous acid and lower trialkyl esters of phosphoric acid.

There are various different methods for preparing lower dialkyl phosphites and lower trialkyl phosphates. A difficulty confronted in these processes is in the removal of hydrogen chloride and alkyl chloride by-products formed during the reaction by which the esters are made from alcohol and chlorine-containing phosphorus compound. If these by-products are allowed to remain in contact with the reaction product, various side reactions take place which decrease the amount of desired product recoverable. For example, if hydrogen chloride is allowed to stay in contact with a lower dialkyl phosphite, the monoalkyl phosphite is formed with eventual degradation to phosphorus acid or chlorides thereof. The presence of hydrogen chloride during the preparation of trialkyl phosphates is also detrimental to the process, due to side reactions. In this instance, the trialkyl phosphate will be degraded to dialkyl phosphate. Heat has also caused the side reactions set forth above to be accelerated. In fact, the heat of reaction alone is even known to cause degradation of the products. By the practice of the present invention, lower dialkyl phosphites and lower trialkyl phosphates have been formed at an excellent conversion rate and in high yield and purity by removing HCl and other by-products rapidly and efficiently from the reaction mixture and at the same time keeping the "reaction mixture," including the HCl and products, at a relatively low temperature.

In accordance with this invention, it has been found that esters of phosphorus selected from the group consisting of lower dialkyl phosphites and lower trialkyl phosphates may be formed by passing a liquid, lower alcohol and a gaseous phosphorus-containing compound selected from the group consisting of phosphorus oxychloride and phosphorus trichloride into a reaction zone which is maintained under subatmospheric pressure, vaporizing the lower alcohol to gaseous reactant form at the reaction zone so that it exerts its cooling effect on the reaction mixture to lower the temperature rise caused by the heat of reaction. It has been found that at substantially ambient temperatures, with the reaction column or area maintained under a partial vacuum, the effect of the heat of reaction is virtually cancelled by the evaporative cooling effect of the alcohol. This cooling effect is caused by alcohol being vaporized as it enters the zone or column at a point where the reaction is taking place. As a result of this evaporative cooling, the reaction product, lower dialkyl phosphite or lower trialkyl phosphate, is not degraded and the by-products may be removed efficiently and rapidly, assisted by the presence of excess alcohol, too. Thus, neither heat, hydrogen chloride gas nor other by-products are allowed to affect the product substantially in the reaction zone and cause degradation of the product. Furthermore, the temperatures of the phosphite or phosphate and the HCl are held low, to minimize their reaction, while the temperatures are sufficient to promote the desired reactions of $POCl_3$ or $PCl_3$ with lower alkanol.

For a more detailed illustration of the invention, reference is made to the following description and accompanying diagram which illustrates but does not limit the practice of this invention. A phosphorus-containing compound selected from the group consisting of phosphorus oxychloride and phosphorus trichloride is fed into reaction column 10 by line 12 from a phosphorus compound feed supply 15 at a point below a point at which line, or conduit 14 introduces alcohol into the reaction zone 30 from liquid alcohol feed supply 17. Reaction column 10 packed with a packing material 19, is kept under reduced pressure. Vacuum means 16 is utilized to apply a vacuum to the system. As a result of the conditions of the subatmospheric pressure under which this system is operated, the reactants entering column 10 through valves 26 and 28 will either fully or partially vaporize. Thus, the reaction takes place in substantially a vapor phase. Being led into the column lower down than the alcohol, the $PCl_3$ or $POCl_3$ vaporizes substantially entirely before it ascendingly enters the reaction zone 30 proper where it contacts alcohol. The product formed, i.e., the lower dialkyl phosphite or a lower trialkyl phosphate then descends the column 10 to be delivered to product vessel 20 adjacent the base of the column. In doing this, it is additionally cooled by vaporization of the $PCl_3$ or $POCl_3$ below the reaction zone as it vaporizes on entering the column. The by-products of the reaction, HCl, alkyl chloride, together with excess alcohol and so forth are carried over to by-product vessel 22 through line 23. The by-products in vessel 22, which are cooled by means of an ice trap (not shown) to condense the vapors, may be recycled after allowing them to warm to room temperature. Before recycling the by-products sufficient alcohol is added to make up the required mole ratio, or excess, as required in the reaction. The recycled by-products may then be fed through line 14 into reaction zone 10.

In the process of this invention, the reaction zone 30 of column 10 maintains a temperature of about 0 and 40 degrees centigrade, by maintaining it at a preferable subatmospheric pressure of between about 10 and 80 mm. Hg. A subatmospheric pressure of between about 5 and 600 millimeters of mercury absolute depending upon the alcohol being utilized may be imposed on the column. However, pressures of from about 5 to 200 millimeters of mercury absolute will maintain the column at substantially ambient temperatures and yield favorable results. The preferred conditions at which the reaction zone may be maintained is between about 20 and 80 millimeters of mercury absolute which will maintain a temperature of from 10 to 40 degrees centigrade.

Alcohols having about 1 to 6 carbon atoms may be utilized in the practice of this invention, e.g., methanol, ethanol, m-propyl, n-butyl, n-pentyl, n-hexyl, isopropyl, isobutyl, tertiary butyl, sec-butyl, isopentyl, tert.-pentyl alcohols and isomers thereof and so forth. It is preferred, however, to utilize an alcohol containing 1 to 4 carbon atoms. With the condition in the reaction column maintained under subatmospheric pressures most suitable for the reaction to occur, it is believed that the phosphorus-containing compound will rise and contact the vaporized alcohol in reaction zone 30. The heat of vaporization or evaporative cooling of the alcohol in the reaction zone is sufficient to act as a coolant and cause the reaction, which is exothermic, to take place under moderate conditions and result in the recovery of a product in satisfactory quantity and quality.

The reactions of this invention, e.g., the reaction of phosphorus trichloride and methanol, are spontaneous and exothermic, yielding large quantities of heat. It has been found that, following the invented process, the addition of excess alcohol does not cause the occurrence of unfavorable results but instead tends to cool the reaction sufficiently to increase the yields of products. Generally, three moles of alcohol are reacted with one mole of phosphorus trichloride in such esterification processes but in carrying out the process of the instant invention wherein the alcohol is utilized as a reactant and for evaporative coolant purposes, between about 100 and 600 percent in excess of the stoichiometric amount to alcohol is preferably utilized, with between about 200 and 400 percent in excess of the stoichiometric amount of alcohol being most preferred.

The rate of flow of the reactants into reaction vessel 10 may be controlled so the reactants are retained within the reaction zone for a time from about 0.1 to 25 seconds, preferably 0.3 to 5 seconds. These retention times, although measured on the basis of the complete column may be substantially less as the reaction zone occupies about twenty-five percent of the reaction column. Thus, it may be possible to shorten the reaction column to effect shorter retention times.

The column reactor in this process may be packed with Raschig rings, glass belices, Burl saddles and so forth.

The following examples illustrate the invention, but are not to be considered as limiting it. All parts are by weight and temperatures are in degrees centigrade unless otherwise stated.

*Examples 1–17*

In these examples, as set forth in Table I, between about 1 and 4 moles of phosphorus trichloride and excess alcohol (100–60%) were added to a column packed with Raschig rings as illustrated in the accompanying drawing, which column was under reduced pressure. These reactants produced a dialkyl phosphite. The exothermic heat of reaction was counteracted by the evaporative cooling effect imparted by the liquid alcohol evaporating under reduced pressure in the reaction zone. The $PCl_3$ was admitted to the column as a gas below the reaction zone, so that it reacted as a gas with the vaporized alcohol. The $PCl_3$ was expanded from the liquid state before entering the reaction zone and therefore was cool enough to exert a cooling effect on product falling through it. No external cooling was utilized in these examples except as indicated below, and the resultant reaction temperature was between 10 and 40 degrees centigrade.

The reaction product in these examples was stripped of an insignificant amount of volatiles under a pressure of 10 millimeters of mercury absolute, the dialkyl phosphite being stripped in a second cut. Dimethyl phosphite was distilled under a pressure of 10 millimeters of mercury at 53 degrees centigrade and diethyl phosphite was distilled at 58 degrees centigrade at 6 millimeters of mercury.

to 84 percent conversion at 400 percent excess methanol. Thus, showing the beneficial results obtainable utilizing an excess of alcohol.

To more graphically illustrate the effect of evaporative cooling as utilized in the practice of the instant invention, Examples 7 and 8 utilized a water bath maintained at 60 to 70 degrees centigrade around the product receiver at the base of the column. This insured the complete absence of volatiles (hydrogen chloride, methanol and methyl chloride) in the crude product when the reaction was completed. In comparing Example 7 with Example 6 in which an identical excess methanol (400 percent) concentration was used, it is noted that the conversion of dimethyl phosphite was reduced from 84 percent to 77 percent when heat was applied. Also, Examples 12 and 13 were made heating a section of the packed column above the product pot, but below the area of evaporative cooling. This also gave a volatile free crude product after the reaction was complete. In comparing these runs with Example 9 in which an identical methanol (600 percent) concentration was used, it is noted that the conversion of dimethyl phosphite was reduced from 85 percent to 56 percent when the heated section of column was utilized. This data indicates the evaporative cooling effects of the present invention even though impressed with heat.

Two series of examples, Examples 2–5 and Examples 9–11, were made utilizing the distillate of methanol, hydrogen chloride and methyl chloride obtained from a prior run as the methanol feed. These distillates had an acid number of about 420 mg. KOH/gm. Examples 2–5 utilized 200 percent excess methanol. Successive conversions of 74%, 75%, 74% and 73% were obtained. Successive conversions of 85 percent, 88 percent and 82 percent were obtained. These results show that the acid distillate containing methanol saturated with methyl chloride and hydrogen chloride can be recycled to the reaction as the methanol feed and have no deleterious effect on the conversion or yield of dimethyl phosphite.

From the data presented in Table I, it is seen that dimethyl phosphite may be prepared in a packed column in high conversion (88 percent) by the reaction of phosphorus trichloride and methanol. The purity of the dimethyl phosphite obtained in this work has consistently been greater than 97 percent. The data further shows that high conversions (97 percent) of diethyl phosphite may be obtained by the process of this invention. Examples 14–16 demonstrate that the conversion of phosphorus trichloride was unaffected as the alcohol concentration was

TABLE I.—COLUMN SYNTHESIS OF DIMETHYL PHOSPHITE AND DIETHYL PHOSPHITE

| Example No. | Pressure, Millimeter of Mercury | Alcohol | | Phosphorus Trichloride | | Retention Time of Reactants in Column (sec.) | Distilled Dialkyl Phosphite | |
|---|---|---|---|---|---|---|---|---|
| | | Type | Percent Excess | Moles | Ml./min. | | Conversion, Percent | Purity, Percent |
| 1 | 40–42 | Methyl | 100 | 2.0 | 3.0 | | 66 | 96 |
| 2 | 37–40 | do | 200 | 2.0 | 2.0 | .89 | 74 | 99 |
| 3 | 39–58 | do | ¹200 | 2.0 | 2.0 | .89 | 75 | 97 |
| 4 | 42–60 | do | ¹200 | 2.0 | 2.0 | | 74 | 98 |
| 5 | 40–69 | do | ¹200 | 2.0 | 2.0 | | 73 | 98 |
| 6 | 37–39 | do | 400 | 2.0 | 2.0 | .42 | 84 | 99 |
| 7 | 30–40 | do | 400 | 2.0 | 2.0 | .44 | 77 | 98 |
| 8 | 20–32 | do | 600 | 2.0 | 2.0 | .30 | 77 | 98 |
| 9 | 20–38 | do | 600 | 2.0 | 2.0 | .32 | 85 | 96 |
| 10 | 22–37 | do | ¹600 | 2.0 | 2.0 | .32 | 88 | 97 |
| 11 | 34–52 | do | ¹600 | 2.0 | 2.0 | | 82 | 98 |
| 12 | 27–60 | do | ¹600 | 2.0 | 2.0 | | 60 | 96 |
| 13 | 30–52 | do | ¹600 | 2.0 | 2.0 | | 56 | 98 |
| 14 | 25–30 | Ethyl | 400 | 2.0 | 2.0 | | 91 | 98 |
| 15 | 25–27 | do | ¹400 | 2.0 | 2.0 | | 96 | 97 |
| 16 | 60–80 | do | ¹200 | 4.0 | 2.0 | .48 | 97 | 97 |
| 17 | 23–26 | do | ¹100 | 2.0 | 2.0 | | 85 | 97 |

¹Recycle hydrogen chloride saturated alcohol used as alcohol feed.

Examples 1, 4, 6 and 9 show that the conversion of dimethyl phosphite increases as the concentration of methanol is increased. The dimethyl phosphite conversion increased from 67 percent at 100 percent excess methanol decreased from 400 percent to 200 percent excess ethanol. Examples 15 and 16 were run employing ethanol saturated with hydrogen chloride and ethyl chloride obtained from a prior distillate as the ethanol feed. No deleterious effect was obtained using the acidic ethanol feed showing that the volatile distillate may be recycled. Together with the high conversion, diethyl phosphite was obtained in 97 to 98 percent purity in this process as illustrated by Examples 14–17.

Example 18.—Dibutyl phosphite

Liquid butyl alcohol (200 percent excess of a stoichiometric amount) was passed into a reaction column maintained at a subatmospheric pressure of about 20 to 40 millimeters mercury absolute at a point adjacent the place of reaction. Phosphorus trichloride (2.0 moles) was passed into the column at a point below the reaction zone where it substantially vaporized as it entered the reaction column as did phosphorus trichloride. The reaction which was substantially instantaneous was moderated by evaporative cooling of the vaporizing alcohol which extracted heat from the reaction mixture and maintained the temperature of the reaction zone and column below about 40 degrees centigrade. The product formed descends through the cool phosphorus trichloride vapors to the product vessel. Excess butanol was distilled from the reaction product at about 43 to 52 degrees centigrade under a vacuum of 3 to 40 millimeters of mercury absolute. In Examples 1 to 17, the amount of alcohol which had to be stripped from the product vessel was less than 3 percent whereas with butanol more than 3 percent of the volume in the product flash were volatiles. Dibutyl phosphite was obtained by distilling the contents of the reaction product vessel at 90 degrees centigrade at 1.5 millimeters of mercury absolute, in 92 percent yield based on phosphorus trichloride.

Examples 1 to 18 illustrate the commercial embodiment of this invention, but similar high product yields of compounds which possess better than 96 percent purity may also be obtainable when n-propanol, n-pentanol, n-hexanol, isopropanol, isobutanol, tertiary butanol, sec.-butanol, isopentanol, tert.-pentanol isomers thereof and so forth, are reacted with phosphorus trichloride following the teachings of this invention.

Example 19.—Trimethyl phosphate

Utilizing the column reactor as set forth in Examples 1–18 and adding the reactants continuously to the column as set forth therein, a 400 percent of excess methanol was fed into the column maintained at 25 millimeters of mercury absolute. Phosphorus oxychloride (1.5 moles) was added from a feed point below the reaction zone at a rate of flow of about 2 to 3 milliliters per minute. The material collected in the product vessel was stripped of methanol at about 30 to 45 degrees centigrade at 25 to 150 millimeters of mercury absolute. Trimethyl phosphate was distilled from the product vessel at about 69 to 72 degrees centgrade utilizing a pressure of about 10 millimeters of pressure and was recovered in 81.2 percent yield, based on phosphorus oxychloride, having a purity of 98 percent. The purity was determined by an iodine test as was the case in Examples 1–18.

Examples 19 and 20 to 23 illustrate the process of the instant invention in its commercial embodiment. However, when phosphorus oxychloride and butanol, n-propanol, n-pentanol, n-hexanol, isopropanol, isobutanol, tert.-butanol, sec.-butanol, isopentanol, tert.-pentanol, isomers thereof and so forth are reacted corresponding phosphates may be recovered in substantial yields and purity.

Examples 20–23.—Triethyl phosphate

The procedure and apparatus as set forth in Examples 1–18 was utilized in these examples, except that the pressure of the column was maintained at a subatmospheric pressure of 30 millimeters of mercury absolute and the excess alcohol varied. The results obtained from these examples are set forth in Table II. When the points of addition of the reactants are reversed, more volatiles are obtained in the product vessel and a lower yield of the desired phosphate is obtained.

| Example No. | POCl₃, Moles | Ethanol, Percent Excess | Distilled Triethyl Phosphate | | |
|---|---|---|---|---|---|
| | | | Grams | Percent Yield | Percent Purity |
| 20 | 1.5 | 200 | 228.6 | 84 | 99.7 |
| 21 | 1.5 | 300 | 240.0 | 88 | 99.8 |
| 22 | 1.5 | 400 | 223.1 | 82 | 99.0 |
| 23 | 1.5 | 400 | 222.1 | 82 | 99.0 |

These examples illustrate that within the range of excess ethanol utilized the yield of triethyl phosphate was relatively constant. Example 23 was operated utilizing the distillate from Example 22. This distillate which contained hydrogen chloride and ethyl chloride was mixed with the required amount of additional ethanol to make up the required excess liquid alcohol and recycled to the reaction zone. As indicated by Example 23, no deleterious effect in the yield was observed. The volatiles which were in the product vessel were stripped at about 40 to 90 degrees centigrade under a vacuum of 70 to 100 millimeters of mercury absolute. Triethyl phosphate was distilled off at vapor temperature of about 72–74 degrees centigrade at 5 millimeters mercury absolute. The purity of the product was determined by iodine titration and the yields were based on phosphorus oxychloride.

While the invention has been set forth in relation to particulars and specifics of the examples and drawing above, it should be realized that the invention in its broadest aspects is not limited to the specifics of the above-mentioned examples and drawing. Many other modifications will become apparent to one skilled in the art upon a reading of this basic disclosure; these modifications are considered within the scope of this invention.

What is claimed is:

1. A process for preparing esters of phosphorus selected from the group consisting of lower dialkyl phosphites and lower trialkyl phosphates which comprises passing a liquid lower alcohol and a gaseous phosphorus-containing compound selected from the group consisting of phosphorus oxychloride and phosphorus trichloride into a reaction zone which is maintained under subatmospheric pressure, vaporizing the alcohol to a gaseous reactant form in the reaction zone so that it extracts heat from the reaction mixture, thereby cooling the reaction mixture and maintaining the temperature of the reaction zone and mixture so that the effect of the heat of reaction is canceled, and removing the esters below the reaction zone.

2. A process for preparing esters of phosphorus selected from the group consisting of lower dialkyl phosphites and lower trialkyl phosphates which comprises passing an excess of a liquid lower alcohol and a gaseous phosphorus-containing compound selected from the group consisting of phosphorus oxychloride and phosphorus trichloride into a reaction zone which is maintained under subatmospheric pressure, vaporizing the alcohol to a gaseous reactant form in the reaction zone so that it extracts heat from the reaction mixture, thereby cooling the reaction mixture and maintains the temperature of the reaction zone and mixture in a range between about 0 and 40 degrees centigrade, despite the heat of reaction produced, and removing the esters below the reaction zone.

3. A process for preparing a diester of phosphorous acid which comprises passing an excess of a liquid lower alcohol and phosphorus trichloride into a reaction zone which is maintained under subatmospheric pressure, vaporizing the alcohol to a gaseous reactant form in the reaction zone so that it extracts heat from the reaction mixture, thereby cooling the reaction mixture and maintains the temperature of the reaction zone and mixture in a range between about 0 and 40 degrees centigrade, despite the heat of reaction produced, and removing the ester below the reaction zone.

4. A process for preparing a triester of phosphoric acid which comprises passing an excess of a liquid lower alcohol and phosphorus oxychloride into a reaction zone which is maintained under subatmospheric pressure, vaporizing the alcohol to a gaseous reactant form in the reaction zone so that it extracts heat from the reaction mixture, thereby cooling the reaction mixture and maintains the temperature of the reaction zone and mixture in a range between about 0 and 40 degrees centigrade, despite the heat of reaction produced, and removing the ester below the reaction zone.

5. A process in accordance with claim 3 wherein between about 100 and 600 percent of excessive alcohol is utilized.

6. A process in accordance with claim 4 wherein between about 100 and 600 percent of excessive alcohol is utilized.

7. A process for preparing a lower dialkyl phosphite selected from the group consisting of dimethyl, diethyl and dibutyl phosphite which comprises passing phosphorus trichloride and a liquid lower alcohol in an excess, about 100 and 600 percent, selected from the group consisting of methanol, ethanol and butanol into a reaction zone which is maintained under a subatmospheric pressure of between about 5 and 600 millimeters mercury absolute, so that evaporative cooling is caused, vaporizing the alcohol to a gaseous reactant form in the reaction zone so that it extracts heat from the reaction mixture, thereby cooling the reaction mixture and maintainnig the temperature of the reaction zone and mixture in a range between about 0 and 40 degrees centigrade, despite the heat of reaction produced, and removing the ester below the reaction zone.

8. A process in accordance with claim 7 wherein the subatmospheric pressure is maintained between about 20 and 80 millimeters of mercury absolute.

9. A process for preparing lower dialkyl phosphites wherein the alkyl radical contains between 1 to 6 carbon atoms comprising passing phosphorus trichloride and between about 100 and 600 percent excess liquid alcohol having between 1 to 6 carbon atoms into a reaction zone which is maintained under a subatmospheric pressure of from 5 to 600 millimeters of mercury absolute, vaporizing the alcohol to gaseous reactant form in the reaction zone, so that it extracts heat from the reaction mixture, thereby cooling the reaction mixture and maintaining the temperature of the reaction zone and mixture in a range between about 0 and 40 degrees centigrade despite the heat of reaction produced, cooling the reaction product by the vaporization of phosphorus trichloride, and removing the ester below the reaction zone.

10. A process in accordance with claim 9 wherein the retention time of the reactants and product in said zone is between about 0.1 and 25 seconds.

11. A process for preparing lower triesters of phosphoric acid selected from the group consisting of trimethyl and triethyl phosphate which comprises passing phosphorus oxychloride and a liquid lower alcohol in an excess about 100 and 600 percent selected from the group consisting of methanol and ethanol into a reaction zone which is maintained under subatmospheric pressure of between about 5 and 600 millimeters mercury absolute, so that evaporative cooling is caused, vaporizing the alcohol so that it extracts heat from the reaction mixture, thereby cooling the reaction mixture and maintaining the temperature of the reaction zone and mixture in a range between about 0 and 40 degrees centigrade, despite the heat of reaction produced, and removing the ester below the reaction zone.

12. A process in accordance with claim 11 wherein the subatmospheric pressure is maintained at about 20 and 80 millimeters of mercury absolute.

13. A process for preparing lower trialkyl phosphate wherein the alkyl radical contains between 1 to 6 carbon atoms comprising passing phosphorus oxychloride and between about 100 and 600 percent excess liquid alcohol having between 1 to 6 carbon atoms into a reaction zone which is maintained under a subatmospheric pressure of from 5 to 600 millimeters of mercury absolute, vaporizing the alcohol to gaseous reactant form at the reaction zone so that it extracts heat from the reaction mixture, thereby cooling the reaction mixture, and maintaining the temperature of the reaction zone and mixture in a desirable range despite the heat of reaction produced, cooling the reaction product by the vaporization of phosphorus oxychloride, and removing the desired ester at a place at the base of the reaction zone.

14. A process in accordance with claim 13 wherein the retention time of the reactants and product in said zone is between about 0.1 and 25 seconds.

References Cited

UNITED STATES PATENTS 3,042,697  7/1962  Halter et al. _____ 260—974

CHARLES B. PARKER, *Primary Examiner.*

JOSEPH P. BRUST, *Examiner.*

BERNARD BILLIAN, F. M. SIKKORA,
*Assistant Examiners.*

UNITED STATES PATENT OFFICE
CERTIFICATE OF CORRECTION

Patent No. 3,331,895                              July 18, 1967

Charles F. Baranauckas et al.

It is hereby certified that error appears in the above numbered patent requiring correction and that the said Letters Patent should read as corrected below.

Column 2, line 34, "of about" should read -- between --; line 49, "m-propyl" should read -- n-propyl --. Column 3, line 17, "belices" should read -- helices --; line 26, "(100-60%)" should read -- (100-600%) --. Column 4, line 16, "made" should read -- performed while --. Column 7, line 29, "maintainnig" should read -- maintaining --; lines 38 and 41, "to" should read -- and --. Column 8, line 20, "at" should read -- between --; lines 23 and 26, "to", each occurrence, should read -- and --.

Signed and sealed this 11th day of November 1969.

(SEAL)
Attest:

EDWARD M. FLETCHER, JR.
Attesting Officer

WILLIAM E. SCHUYLER, JR.
Commissioner of Patents